United States Patent
Wu

(10) Patent No.: US 10,745,047 B2
(45) Date of Patent: Aug. 18, 2020

(54) SYNCHRONOUS STEERING VEHICLE BODY

(71) Applicant: Kunliu Wu, Jieyang (CN)

(72) Inventor: Kunliu Wu, Jieyang (CN)

(*) Notice: Subject to any disclaimer, the term of this patent is extended or adjusted under 35 U.S.C. 154(b) by 44 days.

(21) Appl. No.: 16/198,329

(22) Filed: Nov. 21, 2018

(65) Prior Publication Data

US 2019/0092386 A1 Mar. 28, 2019

Related U.S. Application Data

(63) Continuation of application No. PCT/CN2017/080133, filed on Apr. 11, 2017.

(30) Foreign Application Priority Data

Feb. 24, 2017 (CN) .......................... 2017 1 0102365

(51) Int. Cl.
| | |
|---|---|
| *B62D 9/00* | (2006.01) |
| *B62D 5/04* | (2006.01) |
| *F16H 37/06* | (2006.01) |
| *F16H 1/22* | (2006.01) |
| *B62D 33/063* | (2006.01) |

(Continued)

(52) U.S. Cl.
CPC .............. *B62D 9/00* (2013.01); *B62D 5/0418* (2013.01); *B62D 5/0421* (2013.01); *B62D 7/026* (2013.01); *B62D 33/0633* (2013.01); *B62D 61/06* (2013.01); *F16H 1/22* (2013.01); *F16H 37/065* (2013.01)

(58) Field of Classification Search
CPC ...... B62D 9/00; B62D 33/0633; B62D 61/06; B62D 7/026; B62D 5/0418; B62D 5/0421; F16H 1/22; F16H 1/206; F16H 7/06; F16H 37/065
USPC .......................................................... 180/413
See application file for complete search history.

(56) References Cited

U.S. PATENT DOCUMENTS

| | | |
|---|---|---|
| 3,970,160 A | 7/1976 | Nowick |
| 4,219,094 A * | 8/1980 | Sturgill ................ B66C 19/005 180/236 |

(Continued)

FOREIGN PATENT DOCUMENTS

| | | | |
|---|---|---|---|
| CN | 101723000 A | * | 6/2010 |
| CN | 101723000 A | | 6/2010 |

(Continued)

OTHER PUBLICATIONS

Internation Search Report of PCT/CN2017/080133, dated Nov. 30, 2017.

*Primary Examiner* — Anne Marie M Boehler
*Assistant Examiner* — Felicia L. Brittman
(74) *Attorney, Agent, or Firm* — Erson IP (Nelson IP)

(57) ABSTRACT

A synchronous steering vehicle body includes wheels, a cab and a steering mechanism for driving the wheels and the cab to synchronously steer, steering center axes of the wheels are vertical to rotation center axes of the wheels, and the wheels are vertical to the center of the horizontal ground to be concentric to the steering center axes of the wheels, and the steering motions of the wheels and the cab are kept synchronous. The disclosure provides a synchronous steering vehicle body capable of directly achieving the synchronous steering of the wheels and the cab.

11 Claims, 9 Drawing Sheets

(51) Int. Cl.
*B62D 61/06* (2006.01)
*B62D 7/02* (2006.01)

(56) References Cited

U.S. PATENT DOCUMENTS

| | | | |
|---|---|---|---|
| 4,566,553 A | * | 1/1986 | McCutcheon ....... A01B 51/026 |
| | | | 180/14.2 |
| 5,890,557 A | | 4/1999 | Glass et al. |
| 2016/0083022 A1 | | 3/2016 | Hellholm |

FOREIGN PATENT DOCUMENTS

| | | |
|---|---|---|
| CN | 102849103 A | 1/2013 |
| CN | 203228846 U | 10/2013 |
| CN | 206579722 U | 10/2017 |

\* cited by examiner

SYNCHRONOUS STEERING VEHICLE BODY

CROSS-REFERENCE TO RELATED APPLICATIONS

This application is a continuation of International Patent Application No. PCT/CN2017/080133 with a filing date of Apr. 11, 2017, designating the United States, further claims priority to Chinese Patent Application No. 2017101023659 with a filing date of Feb. 24, 2017. The content of the aforementioned application, including any intervening amendments thereto, is incorporated herein by reference.

TECHNICAL FIELD

The disclosure belongs to the technical field of mechanical drive, and particularly relates to a synchronous steering vehicle body.

BACKGROUND OF THE PRESENT INVENTION

In the modern production and life, a vehicle is an essential transport tool. The vehicle has a long development history, and with the development of modern technology, it has huge progress in recent hundred years and brings great convenience for people's life.

There is a revolution speed difference between the internal and external wheels of the present vehicle due to limitation of the structure in the process of steering. In order to make the vehicle keep balance in the process of steering, a differential mechanism and a corresponding mechanical structure must be adopted to regulate the revolution speed difference of the internal and external wheels. The vehicle with such a structure has complicated mechanical structure and many parts, which is not beneficial to application and production manufacturing of vehicles.

SUMMARY OF PRESENT INVENTION

In order to overcome the defects in the prior art, embodiments of the disclosure provide a synchronous steering vehicle body, which can directly achieve the synchronous steering of wheels and a cab without a differential mechanism.

The objective of the embodiments of the disclosure is achieved by the following technical solutions.

A synchronous steering vehicle body, includes wheels, a cab and a steering mechanism for driving the wheels and the cab to synchronously steer, steering center axes of the wheels are vertical to rotation center axes of the wheels, steering motions of the wheels and the cab are kept synchronous, and the synchronous steering vehicle body always rectilinearly moves in the process of steering, thereby avoiding a circular motion which appears in a traditional vehicle body when turning.

As an improvement of the above technical solution, the steering mechanism includes a steering driving device, a plurality of rotary execution mechanisms and a transfer device for connecting the steering driving device and the plurality of steering rotary execution mechanisms; the steering driving device is configured to drive the plurality of rotary execution mechanisms to rotate; an input end of the transfer device is connected with an output shaft of the steering driving device, an output end of the transfer device is respectively connected with the plurality of rotary execution mechanisms, and the cab is connected with the input end or the output end of the transfer device; each of the rotary execution mechanisms includes a steering output shaft connected with the wheel, a rotary center axis of the steering output shaft is vertical to a center axis of the wheel, and rotational directions of the steering output shafts of the plurality of rotary execution mechanisms are consistent.

Preferably, the transfer device includes a transfer driving gear and a plurality of transfer driven gears; the transfer driving gear is connected to an output end of the steering driving device, the plurality of transfer driven gears are engaged to the transfer driving gear, the transfer driven gears are respectively connected with input ends of the rotary execution mechanisms, and a rotary shaft of the transfer driving gear is connected with the cab.

Preferably, each of the rotary execution mechanisms further includes an output gear for driving the steering output shaft to rotate; and the output gear is connected with the transfer driven gear by a gear drive relationship.

Preferably, the transfer device includes a multi-row chain wheel, the multi-row chain wheel is respectively connected with the input ends of the plurality of rotary execution mechanisms by a chain drive relationship, and a rotary shaft of the multi-row chain wheel is connected with the cab.

Preferably, each of the rotary execution mechanisms further includes an output chain wheel for driving the steering output shaft to rotate; and the output chain wheel is connected with the multi-row chain wheel by a chain drive relationship.

Preferably, the transfer device includes a multi-groove pulley; the multi-groove pulley is respectively connected with the input ends of the plurality of rotary execution mechanisms by a belt drive relationship, and a rotary shaft of the multi-groove pulley is connected with the cab.

Preferably, the transfer device is a planetary gear train, and the transfer device includes a sun gear, a plurality of planet gears and a planet carrier; the sun gear is driven by the steering driving device to rotate, and output ends of the planet gears are connected with the input ends of the rotation execution mechanisms.

Preferably, the steering driving device includes a drive motor and/or a drive turntable; output ends of the drive motor and/or the drive turntable are connected with the input end of the transfer device through a reduction gear.

Preferably, the steering mechanism includes wheel steering motors and a cab steering motor; the wheel steering motors are correspondingly connected with the wheels one by one for driving the wheels to steer; the cab steering motors are connected with the cab for driving the cab to steer; the wheel steering motors and the cab steering motor have identical rotational motion characteristics, and are capable of achieving synchronous rotation.

The embodiments of the disclosure have the beneficial effects that the cab and the wheels are synchronously rotated by arranging the wheels and the rotatable cab on the synchronous steering vehicle body, the center of gravity of the vehicle body is kept steady and synchronous, the steering of the wheels is achieved without a differential mechanism, and a vehicle body capable of directly achieving synchronous steering is provided.

In order to make the above objectives, features and advantages of the embodiments of the disclosure more clear and understandable, the description will be described in detail with reference to preferred embodiments and in combination with accompany drawings.

Figure 1:
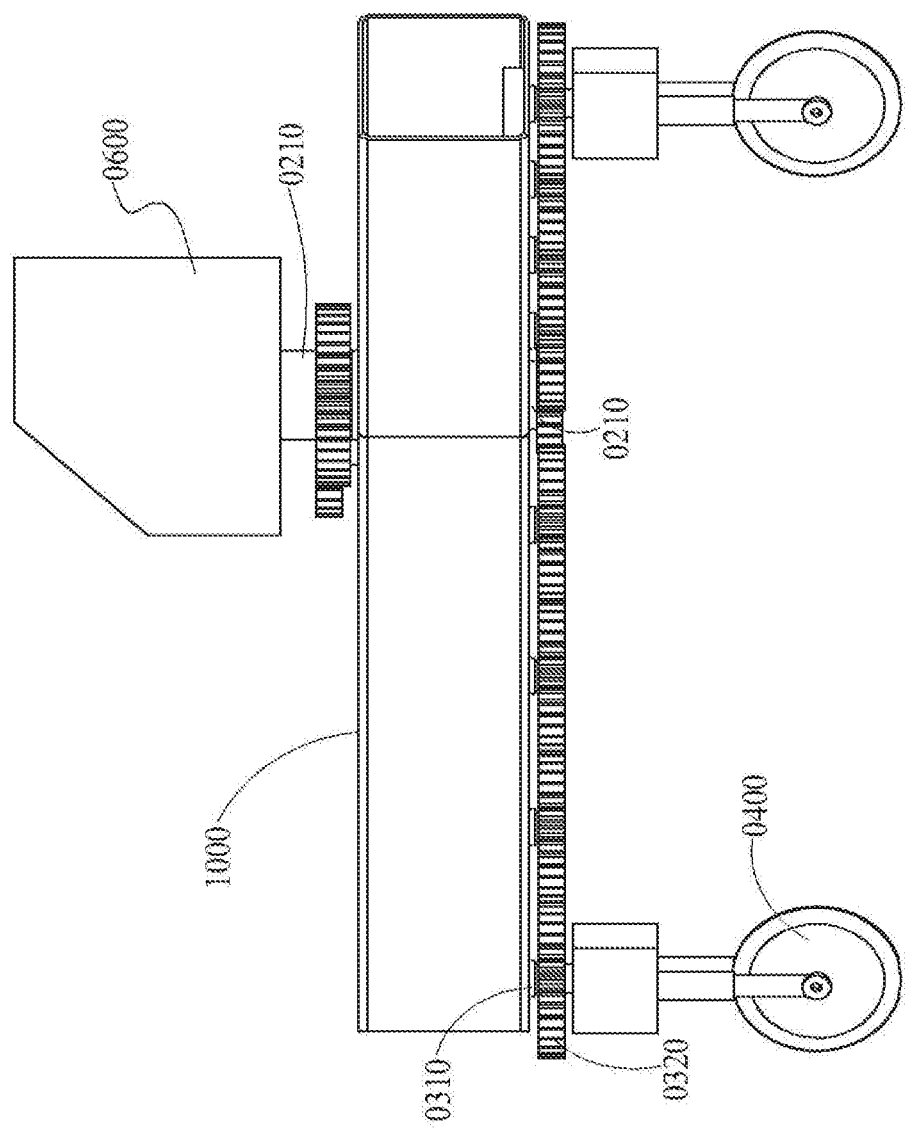
FIG. 1 is a front view of a synchronous steering vehicle body according to embodiment 1 of the disclosure.

In the drawings, 1000—synchronous steering vehicle body, 0100—steering driving device, 0110—drive motor, 0200—transfer device, 0211—transfer main shaft, 0220—transfer driving gear, 0230—transfer driven gear, 0240—transition gear set, 0250—multi—row chain wheel, 0260—chain, 0300—rotary execution mechanism, 0310—steering output shaft, 0320—output gear, 0330—output chain wheel, 0400—wheel, 0500—reduction gear set, 0510—driving gear, 0520—driven gear, 0600—cab, 0700—wheel steering motor, and 0800—cab steering motor.

DETAILED DESCRIPTION OF PREFERRED EMBODIMENTS

In order to facilitate understanding of the embodiments of the disclosure, the synchronous steering vehicle body will be described more comprehensively with reference to relevant drawings in the following. The drawings show preferred embodiments of asynchronous vehicle body. However, the synchronous vehicle body can be achieved through many different forms, but is not limited to embodiments described herein. On the contrary, the objective of providing these embodiments is to make the disclosed content of the synchronous steering vehicle body more thorough and comprehensive.

It is noted that when an element is called "fixed on" another element, it can be directly located on another element, or a middle element exists. When an element is considered as "connecting" another element, it can be directly connected to another element, or, possibly, a middle element simultaneously exists. On the contrary, when an element is called "directly located" "on" another element, a middle element does not exist. Terms "vertical", "horizontal", "left", "right" and similar descriptions used herein are only for the purpose of illustration.

Unless otherwise defined, all the technological and scientific terms used herein have the same meaning as that understood typically by one of ordinary skill in the art. The terms used in the description of the synchronous steering vehicle body herein are only for the purpose of describing embodiments but not intended to limit the disclosure. The term "and/or" used herein includes one or more any and all combinations of the relevant listed items.

Embodiment 1

Referring to FIG. 1, a synchronous steering vehicle body 1000 includes wheels 0400, a cab 0600 and a steering mechanism for driving the wheels 0400 and the cab 0600 to synchronously steer. Steering center axes of the wheels 0400 are vertical to rotation center axes of the wheels 0400, and the steering motions of the wheels 0400 and the cab 0600 are kept synchronous.

The cab 0600 can synchronously steer along with the steering of the wheels 0400. In other words, when the synchronous steering vehicle body 1000 steers, the cab 0600 synchronously rotates along with them, so that the direction of a driver is always kept synchronous to the motion direction of the synchronous steering vehicle body 1000.

The synchronous motions of the wheels 0400 and the cab 0600 are kept synchronous, which mainly means that the steering speeds, directions and sensitivities of the wheels 0400 and the cab 0600 are all kept consistent. The quantity of the wheels 0400 can be plural, and is determined according to practical demand. And then, the synchronous motions of a plurality of wheels 0400 and the cab 0600 are kept synchronous.

In the process of steering, the synchronous steering vehicle body 1000 always rectilinearly moves, thereby avoiding a circular motion which appears in a traditional vehicle body when turning. Accordingly, the center of gravity of the synchronous steering vehicle body 1000 is always kept steady, and therefore a centrifuge phenomenon which appears in a traditional vehicle in the process of steering does not occur, it is ensured that various wheels 0400 have no speed differences, and the stationarity of the synchronous steering is further improved.

Preferably, a rotary shaft of the cab 0600 is connected with the transfer main shaft 0210 of the transfer device 0200 so that the cab 0600 is located at the center of gravity of the synchronous steering vehicle body 1000 to ensure that the driving experience and safety of a driver.

Figure 2:
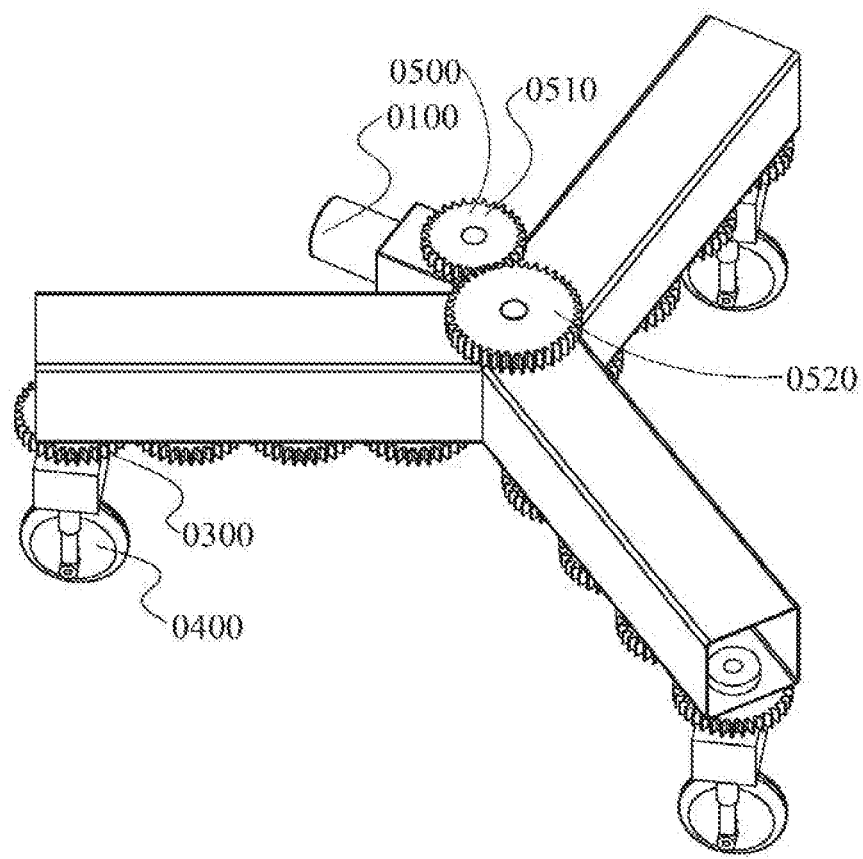
FIG. 2 is a top axonometric view of a steering structure of a synchronous steering vehicle body according to embodiment 1 of the disclosure.
Figure 3:
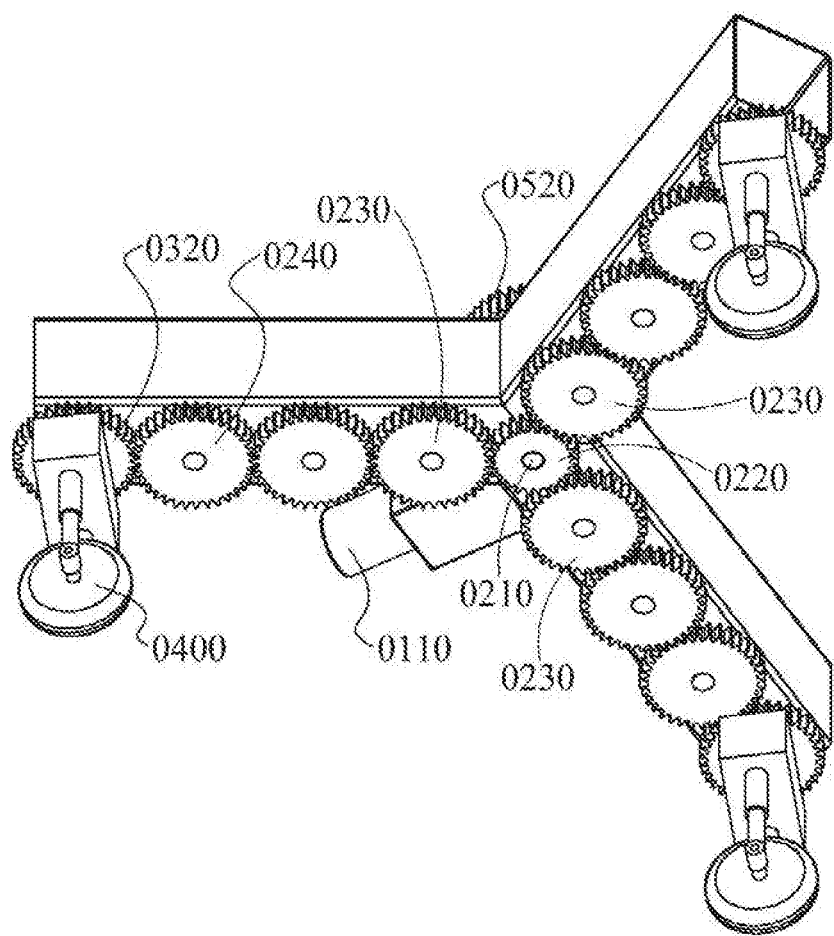
FIG. 3 is a bottom axonometric view of a steering structure of a synchronous steering vehicle body according to embodiment 1 of the disclosure.
Figure 4:
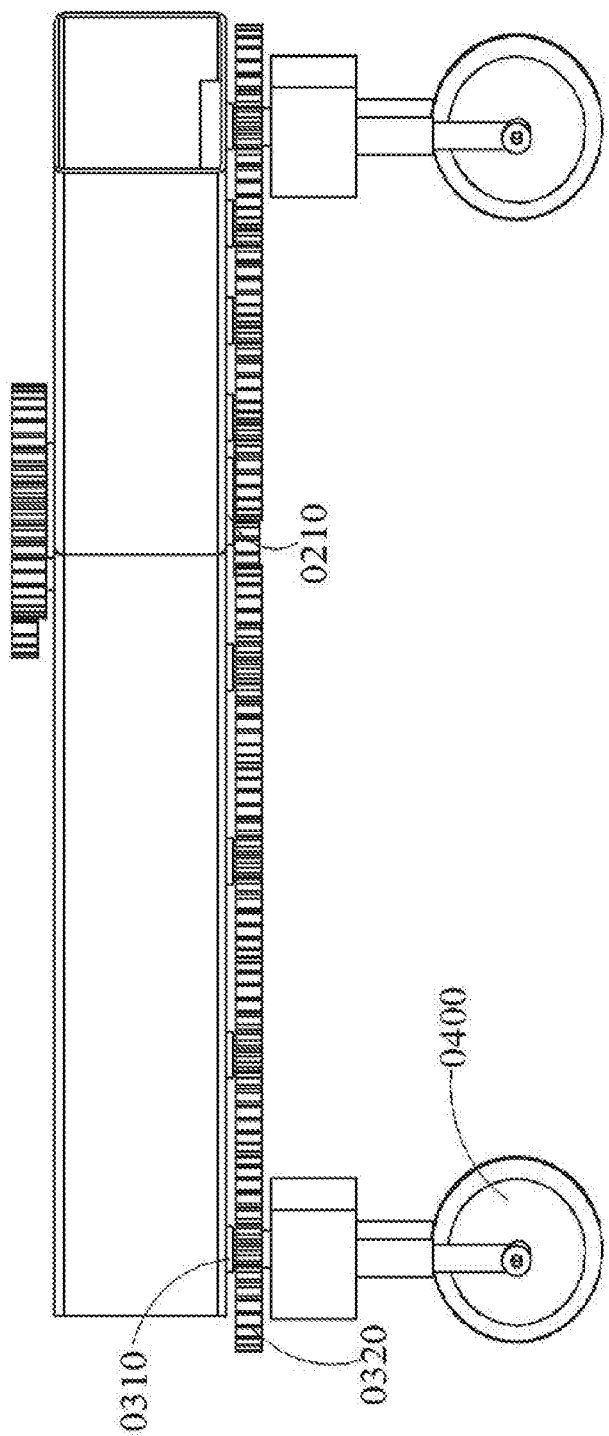
FIG. 4 is a front view of a steering structure of a synchronous steering vehicle body according to embodiment 1 of the disclosure.

Preferably, referring to FIG. 2, FIG. 3 and FIG. 4, the steering mechanism includes a steering driving device 0100, a plurality of rotary execution mechanisms 0300 and the transfer device 0200 for connecting the steering driving device 0100 and the plurality of rotary execution mechanisms 0300.

The steering driving device 0100 is configured to drive the plurality of rotary execution mechanisms 0300 to rotate.

An input end of the transfer device 0200 is connected with an output shaft of the steering driving device 0100, an output end of the transfer device 0200 is respectively connected with the plurality of rotary execution mechanisms 0300, the rotary shaft of the cab 0600 is connected with the input end or the output end of the transfer device 0200.

The rotary execution mechanism 0300 includes a steering output shaft 0310 connected with the wheel 0400, the rotation center axis of the steering output shaft 0310 is vertical to the center axis of the wheel 0400, and the rotational directions of the steering output shafts 0310 of the plurality of rotary execution mechanisms 0300 are consistent.

When steering, the steering driving device 0100 outputs power to the transfer device 0200, and then the transfer device 0200 allocates the power to various rotary execution mechanisms 0300. The rotary execution mechanisms 0300 output the power to the wheels 0400 through the steering output shafts 0310 to achieve the synchronous rotation of various wheels 0400.

Meanwhile, the transfer device 0200 drives the cab 0600 to synchronously rotate, ensuring that the steering of the wheels 0400 is synchronous to that of the cab 0600.

Since the rotational directions of various steering output shafts 0310 are consistent, the rotational directions of various wheels 0400 are kept consistent as well. Meanwhile, the revolution speeds of various wheels 0400 are also kept consistent due to the effect of the transfer device 0200 so as to ensure that various wheels 0400 synchronously and timely steer, and steering is balanced and stable without a speed difference. Accordingly, the synchronous steering of various wheels 0400 is achieved without a differential mechanism. The structure is simple and easily to achieve, and cost is saved.

Preferably, the plurality of rotary execution mechanisms 0300 are uniformly distributed along the rotation circumference of the output end of the transfer device 0200, so that stresses of various rotary execution mechanisms 0300 tend to be uniform, and motions tend to be synchronous.

Preferably, the steering driving device 0100 includes a drive motor 0110 and/or a drive turntable, the output end of the drive motor 0110 and/or the drive turntable is connected with the input end of the transfer device 0200 through a reduction gear.

For this embodiment, the steering driving device 0100 adopts a structure form of the drive motor 0110. The drive motor 0110 is connected with the transfer device 0200 through a reduction gear set 0500, and the reduction gear set 0500 includes a driving gear 0510 and a driven gear 0520 which are mutually engaged, the driving gear 0510 is arranged at the output shaft end of the drive motor 0110, and the driven gear 0520 is arranged at the input shaft end of the transfer device 0200.

Accordingly, the drive motor 0110 outputs power, the rotation angle of the drive motor 0110 is controlled through an encoder, and thus the rotation angles of the rotary execution mechanisms 0300 and the wheels 0400 are controlled, so that the steering of the wheels 0400 is precise and controllable.

In another embodiment, the steering driving device 0100 also adopts the drive turntable, namely, a form of a steering wheel. A user can achieve an effect of precise steering by means of rotating the steering wheel to control the rotation angles of the rotary execution mechanisms 0300 and the wheels 0400 as well.

Preferably, the transfer device 0200 includes a transfer driving gear 0220 and a plurality of transfer driven gears 0230:

the transfer driving gear 0220 is connected to the output end of the steering drive device 0100, the plurality of transfer driven gears 0230 are engaged to the same transfer driving gear 0220, the transfer driven gears 0230 are respectively connected with the input ends of the rotary execution mechanisms 0300, and the rotary shaft of the transfer driving gear 0220 is connected with the cab 0600.

Specifically, the transfer driving gear 0220 is arranged on the transfer main shaft 0210, the input end of the transfer main shaft 0210 is provided with the driven gear 0520 to receive a drive force derived from the steering driving device 0100. Meanwhile, the transfer main shaft 0210 is connected with the cab 0600 to ensure that the rotational motion of the cab 0600 is always synchronous to that of the transfer main shaft 0210.

The plurality of transfer driven gears 0230 are distributed at the periphery of one transfer driving gear 0220. All of various transfer driven gears 0230 are kept to be engaged with the transfer driving gear 0220. In other words, all of various transfer driven gears 0230 are driven by the same transfer driving gear 0220.

Further, each transfer driven gear 0230 is connected to the input end of one rotary execution mechanism 0300, so that all of various rotary execution mechanisms 0300 are driven by the same transfer driven gear 0220, and then motion elements of various steering output shafts 0310 are kept consistent.

Preferably, the transfer driving gear 0220 and the transfer driven gear 0230 may be various gear structure forms, such as a cylindrical gear and a conical gear.

Preferably, the rotary execution mechanism 0300 includes the steering output shaft 0310 and the output gear 0320 driving the steering output shaft 0310 to rotate.

The steering output shaft 0310 is connected with the wheel 0400, the output gear 0320 is connected with the transfer driven gear 0230 by a gear drive relationship.

Specifically, the transfer driven gears 0230 respectively drive the output gears 0320 to achieve synchronous steering motions of various rotary execution mechanisms 0300.

Preferably, a transition gear set 0240 is arranged between the output gear 0320 and the transfer driven gear 0230 to deliver power.

Preferably, the wheel 0400 is provided with a hub motor for driving the rotation of the wheel 0400.

Specifically, each wheel 0400 is provided with one hub motor. The wheels 0400 can rotate around the geometrical center shafts of the wheels 0400 under the driving of the hub motors. Accordingly, various wheels 0400 have independence of their rotation motions, their speeds are easy to control and regulate in the processes of their motions and steering, so as to further improve the stationarity and adaption of motion.

Preferably, the wheel 0400 has a brake function, and can adopt forms such as electronic brake, disc type brake or drum brake.

Preferably, the wheel 0400 is provided with a magnetic powder brake which has the advantages of rapid response speed, simple structure, no pollution, no noise, no impact vibration, energy conservation and the like.

Preferably, the wheel 0400 is provided with a collecting ring which avoids service conductor of an electronic component to be twisted in the process of rotating.

Embodiment 2

Figure 5:
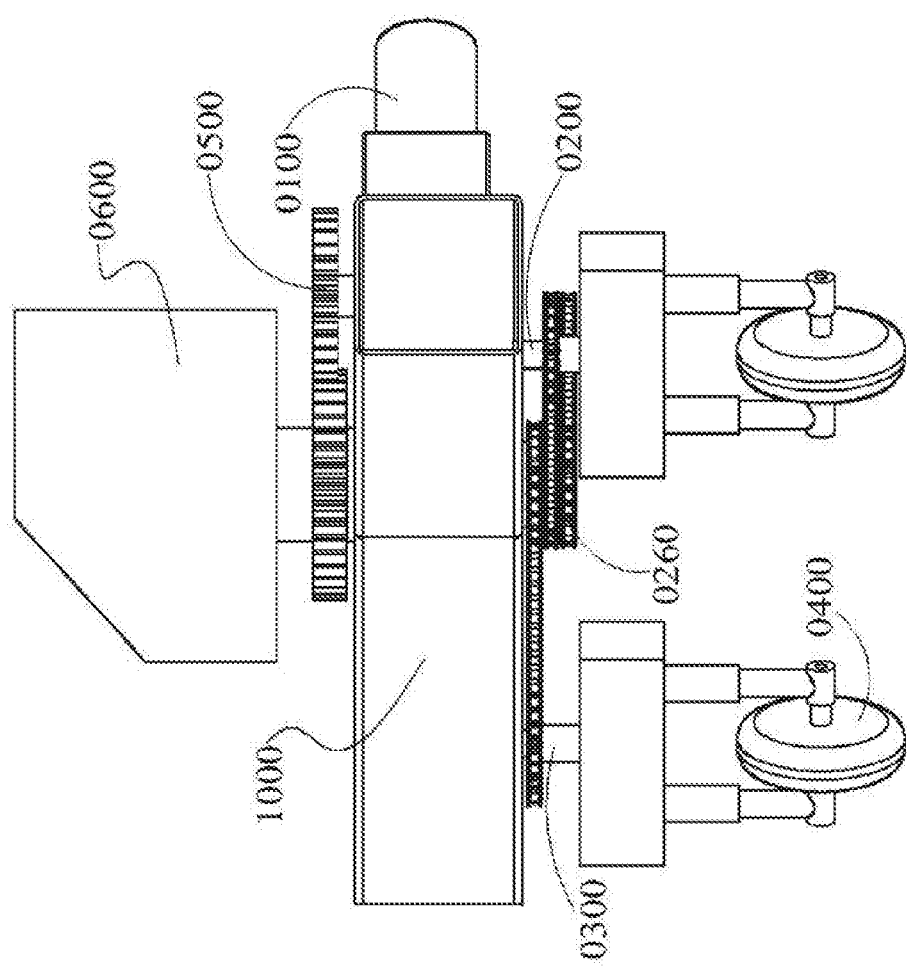
FIG. 5 is a front view of a synchronous steering vehicle body according to embodiment 2 of the disclosure.

Referring to FIG. 5, a synchronous steering vehicle body 1000 includes wheels 0400, a cab 0600 and a steering mechanism for driving the wheels 0400 and the cab 0600 to synchronously steer, wherein, the steering center axes of the wheels 0400 are vertical to the rotation center axes of the wheels 0400, and the steering motions of the wheels 0400 and the cab 0600 are kept synchronous.

Figure 6:
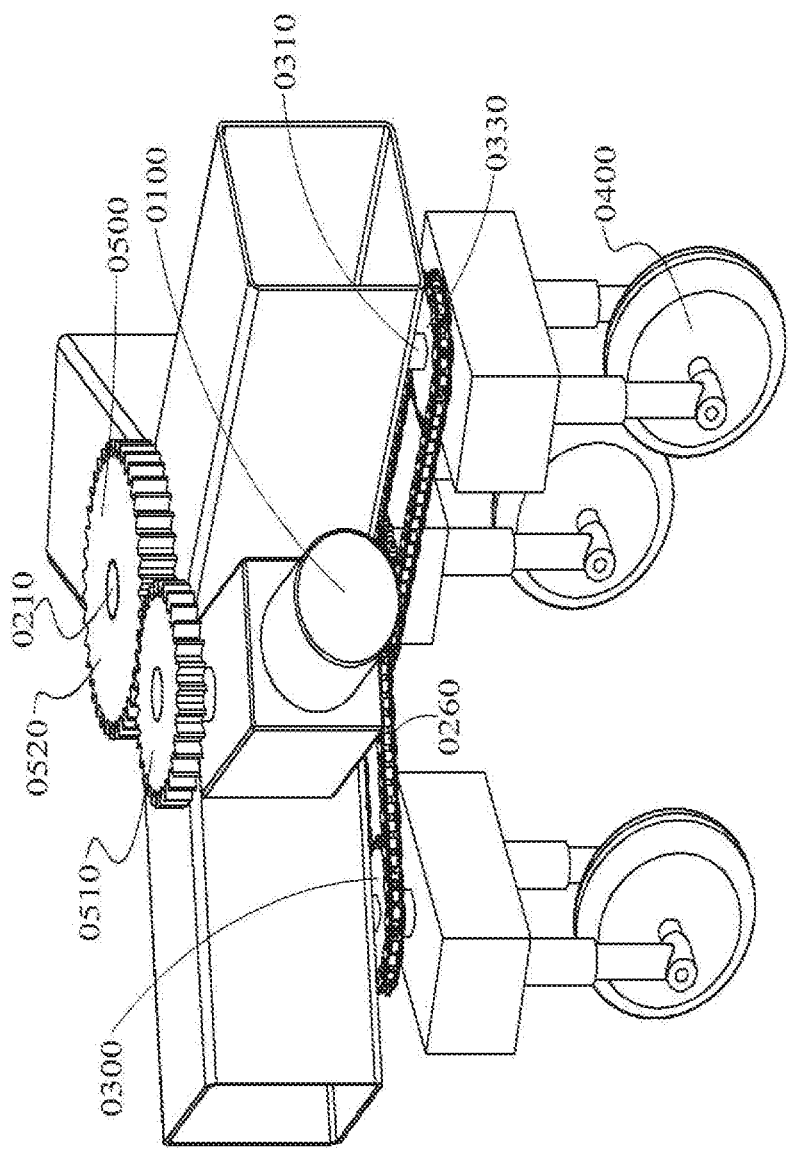
FIG. 6 is a top axonometric view of a steering structure of a synchronous steering vehicle body according to embodiment 2 of the disclosure.
Figure 7:
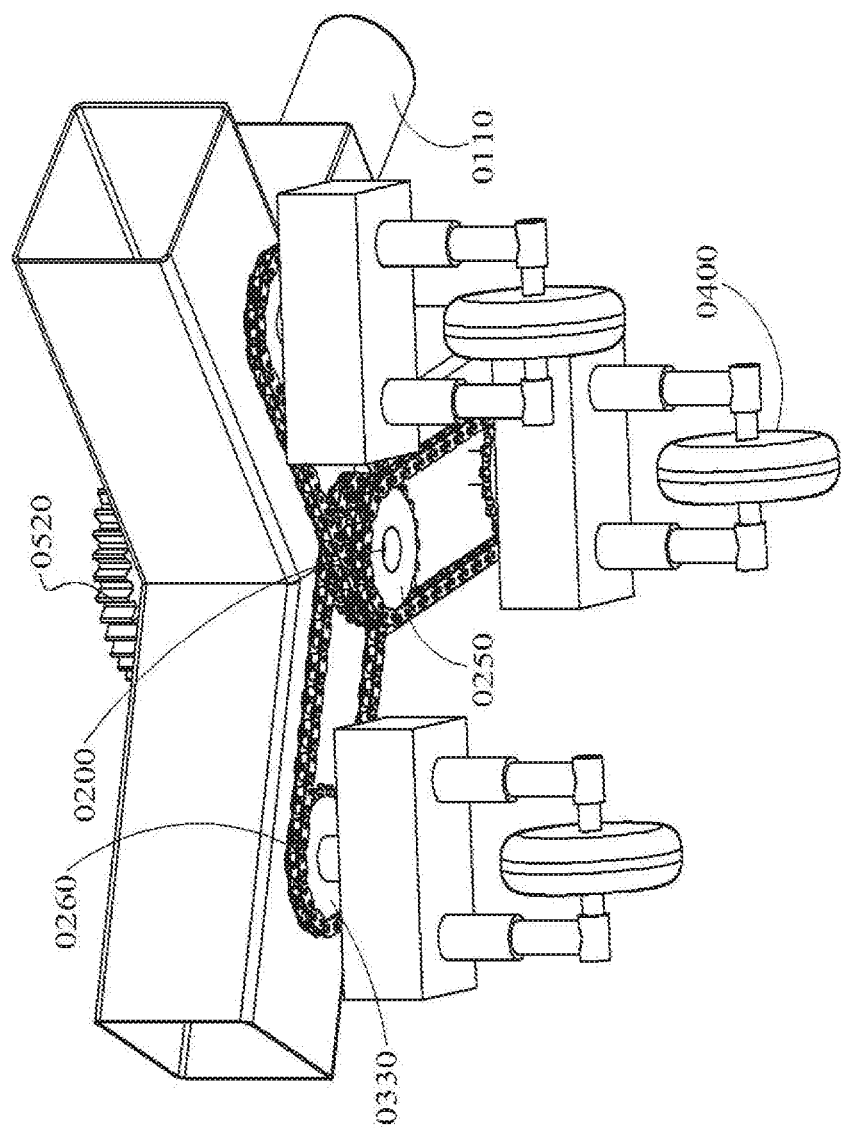
FIG. 7 is a bottom axonometric view of a steering structure of a synchronous steering vehicle body according to embodiment 2 of the disclosure.
Figure 8:
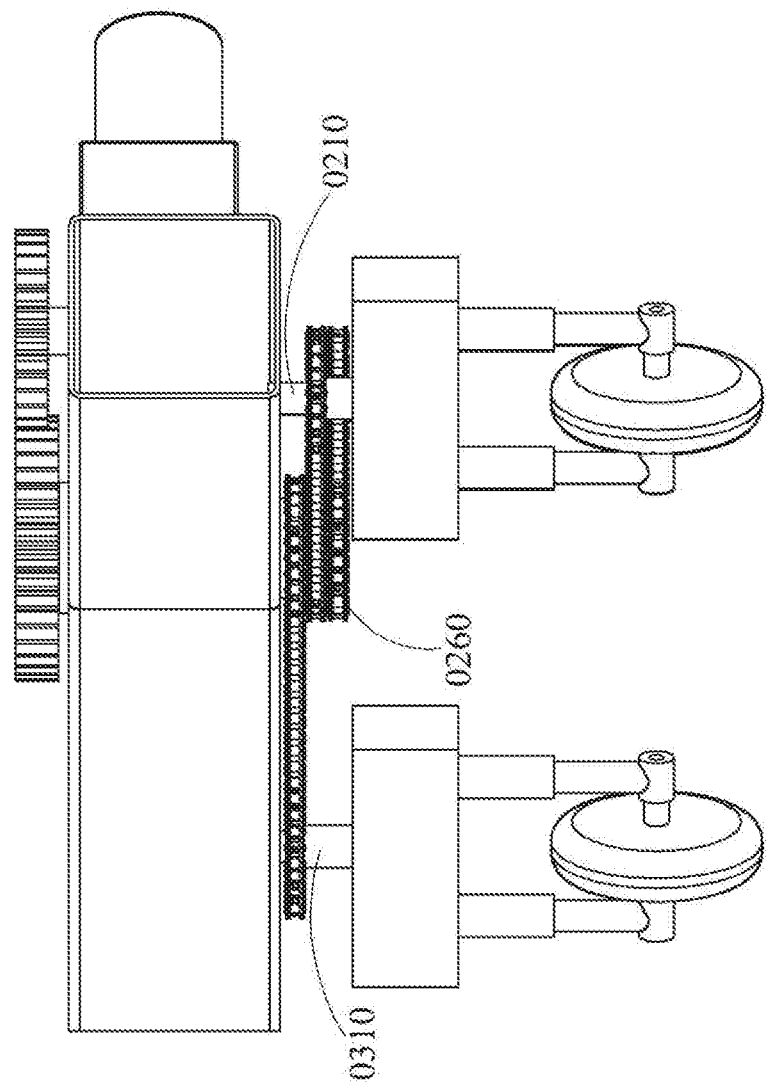
FIG. 8 is a front view of a steering structure of a synchronous steering vehicle body according to embodiment 2 of the disclosure.

Referring to FIG. 6, FIG. 7 and FIG. 8, the steering mechanism includes a steering driving device 0100, a plurality of rotary execution mechanisms 0300 and a transfer device 0200 connecting the steering driving device 0100 and the plurality of rotary execution mechanisms 0300.

The steering driving device 0100 is configured to drive the plurality of rotary execution mechanisms 0300 to rotate.

The input end of the transfer device 0200 is connected with the output shaft of the steering driving device 0100, and the output end of the transfer device 0200 is respectively connected with the plurality of rotary execution mechanisms 0300.

The rotary execution mechanism 0300 includes a steering output shaft 0310 connected with the wheel 0400, the rotation center axis of the steering output shaft 0310 is vertical to the center axis of the wheel 0400, and the rotational directions of the steering output shafts 0310 of the plurality of rotary execution mechanisms 0300 are consistent.

Preferably, the transfer device 0200 includes a plurality of rows of chain wheel 0250, the plurality of rows of chain wheel 0250 are respectively connected with the input ends of the plurality of rotary execution mechanisms 0300 by a chain drive relationship, and the rotary shafts of the plurality of rows of chain wheel 0250 are connected with the cab 0600.

Specifically, the plurality of rows of chain wheel 0250 are arranged on the transfer main shaft 0210, a plurality of rows of gear tooth are present along the axial directions of multi-row chain wheel 0250 and can be engaged with a plurality of chains 0260. In other words, and the plurality of rows of chain wheel 0250 are capable of achieving multi-phase synchronous output.

Meanwhile, the rotary shafts of the multi-row chain wheel 0250; namely, the transfer main shaft 0210 is connected with the cab 0600, ensuring that the rotation synchronization of the multi-row chain wheel 0250, the cab 0600 and the wheels 0400 to achieve synchronous steering.

Preferably, the rotary execution mechanism 0300 includes a steering output shaft 0310 and an output chain wheel 0330 driving the output shaft 0310 to rotate.

The steering output shaft 0310 is connected with the wheel 0400, and the output chain wheel 0330 is connected with the multi-row chain wheel 0250 by a chain drive relationship.

Specifically, two ends of the chain 0260 are respectively engaged with the multi-row chain wheel 0250 and the output chain wheels 0330. The multi-row chain wheel 0250 drive the chain wheels 0330 to rotate by chain drive, and the output chain wheels 0330 drive the steering output shafts 0310 and the wheels 0400 connected to the steering output shafts 0310 to rotate so that the wheels 0400 achieve steering.

Since the multi-row chain wheel 0250 simultaneously forms the chain drive relationship with various rotary execution mechanisms 0300, when the multi-row chain wheel 0250 rotates, various output chain wheels 0330 synchronously rotate, ensuring the synchronous rotation of the steering output shafts 0310 and the wheels 0400 and achieving direct-driven synchronous steering of various wheels 0400.

In another embodiment, the transfer device 0200 includes a multi-groove pulley. The multi-groove pulley is respectively connected with the input ends of the plurality of rotary execution mechanisms 0300 by a belt drive relationship, and the rotary shaft of the multi-groove pulley is connected with the cab 0600.

Further, the rotary execution mechanism 0300 includes the steering output shaft 0310 and an output pulley driving the steering output shaft 0310 to rotate. The steering output shaft 0310 is connected with the wheel 0400, and the output pulley is connected with the multi-groove pulley by a belt drive relationship.

Specifically, the multi-groove pulley has a plurality of rows of belt grooves along its axial direction so as to simultaneously form belt drive fit with a plurality of drive belts, and meanwhile, the rotary shaft of the multi-groove pulley is connected with the cab 0600 to ensure that the steering motion of the cab 0600 is synchronous to that of the wheels 0400.

Furthermore, the multi-groove pulley is a synchronous pulley, the drive belt is a synchronous belt, and the multi-groove pulley is connected with the drive belt in a synchronous belt drive relationship so as to prevent the multi-groove pulley and the drive belt from relatively sliding and to ensure a strict drive ratio.

Under the driving of the multi-groove pulley, various output pulleys synchronously rotate, and then drive the wheels 0400 to steer through the steering output shafts 0310, thereby achieving the direct-driven synchronous steering of various wheels 0400.

In still another embodiment, the transfer device 0200 is a planet gear drive train which includes a sun gear, a plurality of planet gears and a planet carrier, the rotation of the sun gear is driven by the steering driving device 0100, and the output ends of the planet gears are connected with the input ends of the rotation execution mechanisms 0300.

Further, the rotary execution mechanism 0300 includes the steering output shaft 0310 and the output gear 0320 driving the steering output shaft 0310 to rotate, and the steering output shaft 0310 is connected with the wheel 0400. Meanwhile, the output shaft end of each planet gear is provided with a matching gear, and the matching gear is kept to be engaged with the output gear 0320.

Preferably, the rotary shaft of the sun gear is connected with the cab 0600 so that the rotation of the cab 0600 is synchronous to that of the transfer device 0200, and then synchronization of steering motions of the cab 0600 and the wheels 0400 is ensured.

Accordingly, the steering driving device 0100 drives the sub wheel to rotate, the sun gear drives various planet gears to rotate, and drives the steering output shafts 0310 and the wheels 0400 to rotate by a matching relationship between the matching gear and the output gear 0320 to achieve the direct-driven synchronous steering of various wheels 0400.

For the sake of brevity, other features have been described in detail in embodiment 1, which are not repeated again here. It should be understood that agreement between relevant features and embodiment 2 should be adaptive without doubt.

Embodiment 3

Figure 9:
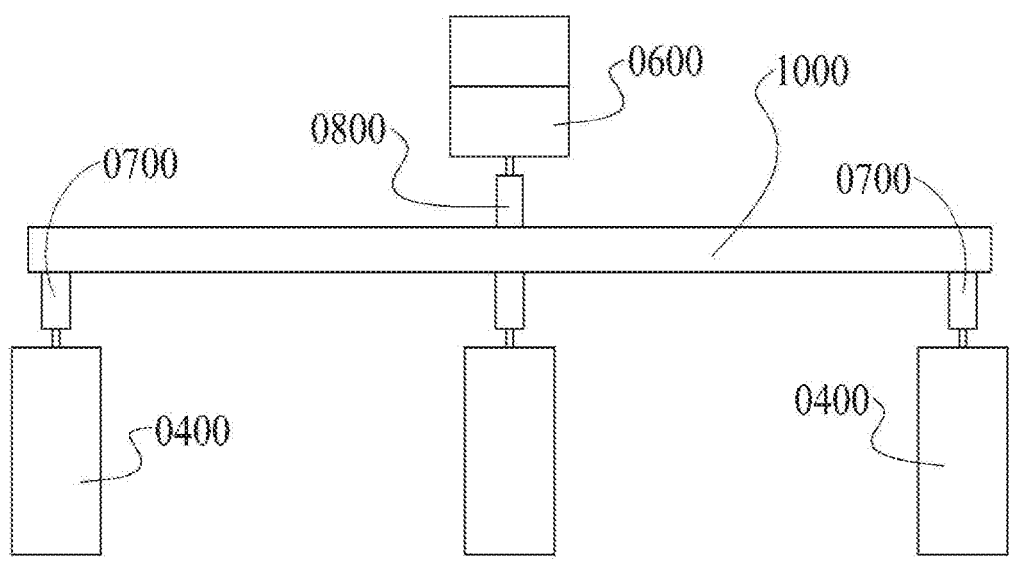
FIG. 9 is a front view of a synchronous steering vehicle body according to embodiment 3 of the disclosure.

Referring to FIG. 9, a synchronous steering vehicle body 100 includes wheels 0400, a cab 0600 and a steering mechanism for driving the wheels 0400 and the cab 0600 to synchronously steer, wherein, the steering center axes of the wheels 0400 are vertical to the rotation center axes of the wheels 0400, and the steering motions of the wheels 0400 and the cab 0600 are kept synchronous.

The steering mechanism includes a wheel steering motor 0700 and a cab steering motor 0800.

The wheel steering motors 0700 are correspondingly connected with the wheels 0400 one by one for driving the wheels 0400 to steer.

The cab steering motor 0800 is connected with the cab 0600 for driving the cab 0600 to steer.

The wheel steering motor 0700 and the cab steering motor 0800 have the same rotational motion characteristics to achieve synchronous rotation.

Specifically, each wheel 0400 is provided with the wheel steering motor 0700 so that various wheels 0400 can independently steer. Meanwhile, all of various wheel steering motors 0700 have the same motor motion characteristics, namely, can simultaneously drive various wheels 0400 to synchronously steer at the same revolution speed.

Further, various wheel steering motors 0700 and the cab steering motor 0800 also have the same motor motion characteristics, and various wheels 0400 and the cab 0600 can be simultaneously driven to synchronous steer at the same revolution speed.

Preferably, the wheel steering motor 0700 and the cab steering motor 0800 are stepping motors or servo motors.

Alternatively, the wheel steering motor 0700 and the cab steering motor 0800 are also provided with position sensors or encoders, and thus the feedback control of the wheel steering motor 0700 and the cab steering motor 0800 is achieved and synchronization of rotation is ensured.

In all of examples illustrated and described herein, any particular values should be explained as being only exemplary but not limiting, and thus other examples of exemplary embodiments can have different values.

It should be noted that similar numbers and letters represent similar items in drawings. Thus, once one item is defined in a drawing, it does not need to be further defined and explained in the subsequent drawings.

The above described embodiments are only several embodiments of the disclosure, their description is specific and detailed but cannot be construed as limiting the scope of the disclosure. It should be noted that several deformations and improvements can also be made by those skilled in the art without departing from the concept of the disclosure, and all of them are included in the protective scope of the disclosure. Thus, the protective scope of the disclosure should take appended claims as a standard.

I claim:

1. A synchronous steering vehicle body, comprising wheels, a cab and a steering mechanism for driving the wheels and the cab to synchronously steer, wherein, steering center axes of the wheels are vertical to rotation center axes of the wheels, steering motions of the wheels and the cab are kept synchronous, and the synchronous steering vehicle body always rectilinearly moves in the process of steering, thereby avoiding a circular motion which appears in a traditional vehicle body when turning;

wherein the steering mechanism comprises a steering driving device, a plurality of rotary execution mechanisms and a transfer device for connecting the steering driving device and the plurality of rotary execution mechanisms; the steering driving device is configured to drive the plurality of rotary execution mechanisms to rotate; an input end of the transfer device is connected with an output shaft of the steering driving device, an output end of the transfer device is respectively connected with the plurality of rotary execution mechanisms, and the cab is connected with the input end or the output end of the transfer device;

wherein each of the rotary execution mechanisms comprises a steering output shaft connected with the wheel, a rotary center axis of the steering output shaft is vertical to a center axis of the wheel, and rotational directions of the steering output shafts of the plurality of rotary execution mechanisms are consistent.

2. The synchronous steering vehicle body according to claim 1, wherein, the transfer device comprises a transfer driving gear and a plurality of transfer driven gears; the transfer driving gear is connected to an output end of the steering driving device, the plurality of transfer driven gears are engaged to the transfer driving gear, the transfer driven gears are respectively connected with input ends of the rotary execution mechanisms, and a rotary shaft of the transfer driving gear is connected with the cab.

3. The synchronous steering vehicle body according to claim 2, wherein, each of the rotary execution mechanisms further comprises an output gear for driving the steering output shaft to rotate, and the output gear is connected with the transfer driven gears by a gear drive relationship.

4. The synchronous steering vehicle body according to claim 2, wherein, both of the transfer driving gear and the transfer driven gears are cylindrical gears.

5. The synchronous steering vehicle body according to claim 2, wherein, both of the transfer driving gear and the transfer driven gears are conical gears.

6. The synchronous steering vehicle body according to claim 1, wherein, the transfer device comprises a multi-row chain wheel, the multi-row chain wheel is respectively connected with input ends of the plurality of rotary execution mechanisms by a chain drive relationship, and a rotary shaft of the multi-row chain wheel is connected with the cab.

7. The synchronous steering vehicle body according to claim 6, wherein, each of the rotary execution mechanisms further comprises an output chain wheel for driving the steering output shaft to rotate, and the output chain wheel is connected with the multi-row chain wheel by a chain drive relationship.

8. The synchronous steering vehicle body according to claim 1, wherein, the transfer device comprises a multi-groove pulley, the multi-groove pulley is respectively connected with input ends of the plurality of rotary execution mechanisms by a belt drive relationship, and a rotary shaft of the multi-groove pulley is connected with the cab.

9. The synchronous steering vehicle body according to claim 1, wherein, the transfer device is a planetary gear train, the transfer device comprises a sun gear, a plurality of planet gears and a planet carrier, the sun gear is driven by the steering driving device to rotate, and output ends of the planet gears are connected with input ends of the rotation execution mechanisms.

10. The synchronous steering vehicle body according to claim 1, wherein the steering driving device comprises a drive motor and/or a drive turntable, and output ends of the drive motor and/or the drive turntable are connected with the input end of the transfer device through a reduction gear.

11. The synchronous steering vehicle body according to claim 1, wherein, the steering mechanism comprises wheel steering motors and a cab steering motor; the wheel steering motors are correspondingly connected with respective wheels for driving the wheels to steer; the cab steering motor is connected with the cab for driving the cab to steer; the wheel steering motors and the cab steering motor have identical rotational motion characteristics, and are capable of achieving synchronous rotation.

\* \* \* \* \*